(12) United States Patent
Hill et al.

(10) Patent No.: US 10,854,116 B2
(45) Date of Patent: Dec. 1, 2020

(54) ADHESIVE LABEL AND ROLL

(71) Applicant: Iconex LLC, Duluth, GA (US)

(72) Inventors: Pamela Sue Hill, Flowery Branch, GA (US); Stephen Cameron Van Winkle, Lawrenceville, GA (US); Austin Daniel Anderson, Dacula, GA (US); Tom Edward Zagaya, Knoxville, TN (US); Robert L. Shinkle, II, Peachtree Corners, GA (US)

(73) Assignee: Iconex LLC, Duluth, GA (US)

( * ) Notice: Subject to any disclaimer, the term of this patent is extended or adjusted under 35 U.S.C. 154(b) by 0 days.

(21) Appl. No.: 16/211,292

(22) Filed: Dec. 6, 2018

(65) Prior Publication Data

US 2019/0180650 A1    Jun. 13, 2019

Related U.S. Application Data

(63) Continuation of application No. 15/241,570, filed on Aug. 19, 2016, now Pat. No. 10,176,731.

(51) Int. Cl.
| | |
|---|---|
| *B41J 3/407* | (2006.01) |
| *G09F 3/10* | (2006.01) |
| *B41J 11/70* | (2006.01) |
| *C09J 7/29* | (2018.01) |

(Continued)

(52) U.S. Cl.
CPC ............ *G09F 3/10* (2013.01); *B41J 3/4075* (2013.01); *B41J 11/703* (2013.01); *C09J 7/20* (2018.01); *C09J 7/29* (2018.01); *C09J 2201/28* (2013.01); *C09J 2203/334* (2013.01); *G09F 2003/0201* (2013.01); *G09F 2003/0229* (2013.01); *G09F 2003/0241* (2013.01); *G09F 2003/0248* (2013.01)

(58) Field of Classification Search
CPC ... B41J 3/4075; B41J 2/315; B41J 2/32; B41J 2/33; B41J 2/325; B41M 5/00; B41M 5/0041; B41M 5/0052; G09F 3/10; G09F 2003/0201; G09F 2003/0229; G09F 2003/0241; C09J 7/02; C09J 2203/334; C09J 2201/28; B41F 16/00; B41F 16/0006
See application file for complete search history.

(56) References Cited

U.S. PATENT DOCUMENTS

| | | | |
|---|---|---|---|
| 2,170,147 | A | 8/1939 | Lane |
| 2,294,347 | A | 8/1942 | Bauer et al. |
| 2,349,710 | A | 5/1944 | Evans |

(Continued)

FOREIGN PATENT DOCUMENTS

| | | |
|---|---|---|
| EP | 2565863 A2 | 3/2013 |
| JP | 2014-160148 A | 9/2014 |

OTHER PUBLICATIONS

"European Application Serial No. 17842217.6, Extended European Search Report dated Apr. 26, 2019", 8 pgs.

(Continued)

*Primary Examiner* — Kristal Feggins
(74) *Attorney, Agent, or Firm* — Schwegman Lundberg & Woessner, P.A.

(57) ABSTRACT

An adhesive label is provided. The adhesive label includes an adhesive patch that covers at least 50% but less than 85% of a backside surface of the adhesive label and that is at least partially horizontally and vertically centered on the backside surface.

12 Claims, 10 Drawing Sheets

(51) Int. Cl.
*C09J 7/20* (2018.01)
*G09F 3/02* (2006.01)

(56) References Cited

U.S. PATENT DOCUMENTS

| | | |
|---|---|---|
| 2,684,316 A | 7/1954 | Warshaw |
| 2,721,810 A | 10/1955 | Schram |
| 2,867,317 A | 1/1959 | Vogt |
| 2,940,868 A | 6/1960 | Patchell |
| 3,503,782 A | 3/1970 | Ayres |
| 3,741,786 A | 6/1973 | Torrey |
| 4,884,826 A | 12/1989 | Slagsvol |
| 4,889,234 A | 12/1989 | Sorensen et al. |
| 5,061,535 A | 10/1991 | Kreckel et al. |
| 5,299,833 A | 4/1994 | Madole, Jr. |
| 5,578,352 A | 11/1996 | Smith |
| 5,691,437 A | 11/1997 | Main |
| 5,725,320 A | 3/1998 | Austin et al. |
| 5,782,494 A | 7/1998 | Crandall et al. |
| 5,926,197 A | 7/1999 | Kessler et al. |
| 5,985,441 A | 11/1999 | Szczepaniec et al. |
| 6,040,026 A | 3/2000 | Iwabuchi |
| 6,139,932 A | 10/2000 | Kline |
| 6,268,032 B1 | 7/2001 | Mertens et al. |
| 6,352,751 B1 | 3/2002 | Mlles et al. |
| 6,383,631 B1 | 5/2002 | Mehta |
| 6,423,392 B1 | 7/2002 | Koch |
| 6,509,077 B1 | 1/2003 | Wantuch et al. |
| 6,585,437 B1 | 7/2003 | Wiklof et al. |
| 6,830,795 B1 | 12/2004 | Downs |
| 7,588,811 B2 | 9/2009 | Blank et al. |
| 10,176,731 B2 | 1/2019 | Hill et al. |
| 2014/0083895 A1 | 3/2014 | Raming |
| 2014/0199477 A1 | 7/2014 | Roth et al. |
| 2015/0086732 A1 | 3/2015 | Wild et al. |
| 2015/0161916 A1 | 6/2015 | Wild et al. |
| 2017/0124920 A1* | 5/2017 | Anderson ............ G09F 3/0288 |
| 2018/0053446 A1 | 2/2018 | Hill et al. |

OTHER PUBLICATIONS

"International Application Serial No. PCT/US2017/047618, International Preliminary Report on Patentability dated Feb. 28, 2019", 7 pgs.

"Adhesive Patch With Voids", U.S. Appl. No. 14/928,525, filed Oct. 30, 2015, 27 pgs.

"U.S. Appl. No. 15/241,570, Advisory Action dated Jun. 28, 2018", 3 pgs.

"U.S. Appl. No. 15/241,570, Final Office Action dated Apr. 6, 2018", 8 pgs.

"U.S. Appl. No. 15/241,570, Non Final Office Action dated Sep. 11, 2017", 7 pgs.

"U.S. Appl. No. 15/241,570, Notice of Allowance dated Aug. 29, 2018", 7 pgs.

"U.S. Appl. No. 15/241,570, Response filed Jun. 6, 2018 to Final Office Action dated Apr. 6, 2018", 7 pgs.

"U.S. Appl. No. 15/241,570, Response filed Jul. 19, 2017 to Restriction Requirement dated May 19, 2017", 7 pgs.

"U.S. Appl. No. 15/241,570, Response filed Dec. 11, 2017 to Non Final Office Action dated Sep. 11, 2017", 7 pgs.

"U.S. Appl. No. 15/241,570, Restriction Requirement dated May 19, 2017", 6 pgs.

"International Application Serial No. PCT/US2017/047618, International Search Report dated Nov. 3, 2017", 2 pgs.

"International Application Serial No. PCT/US2017/047618, Written Opinion dated Nov. 3, 2017", 5 pgs.

* cited by examiner

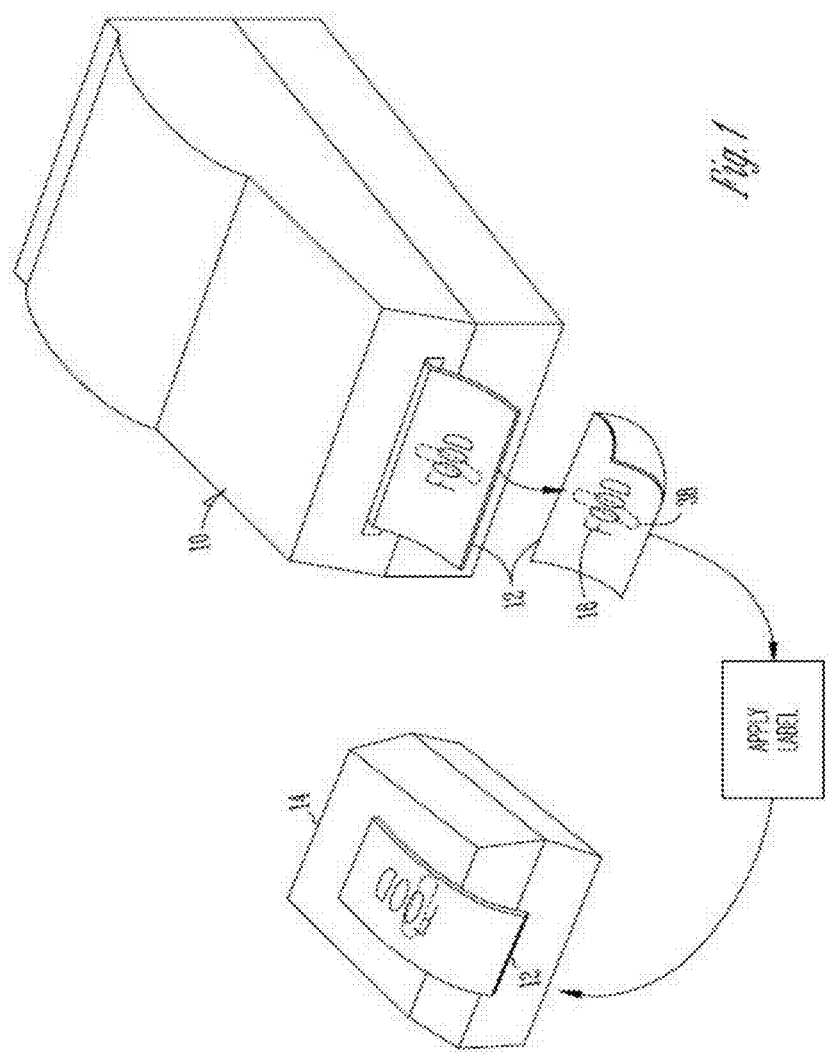

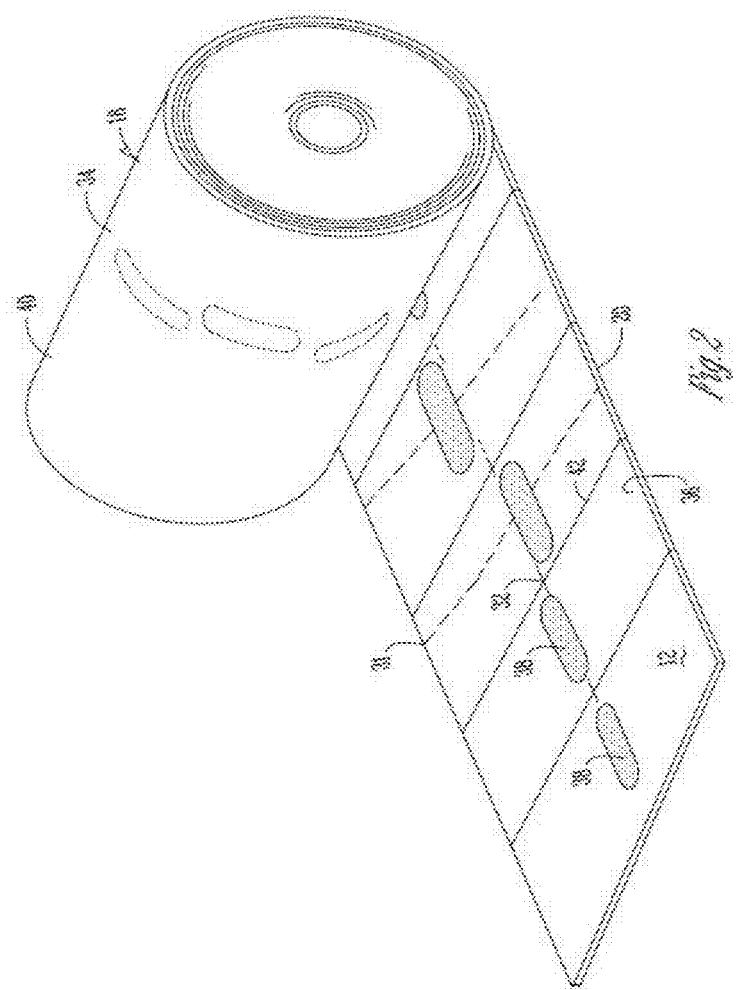

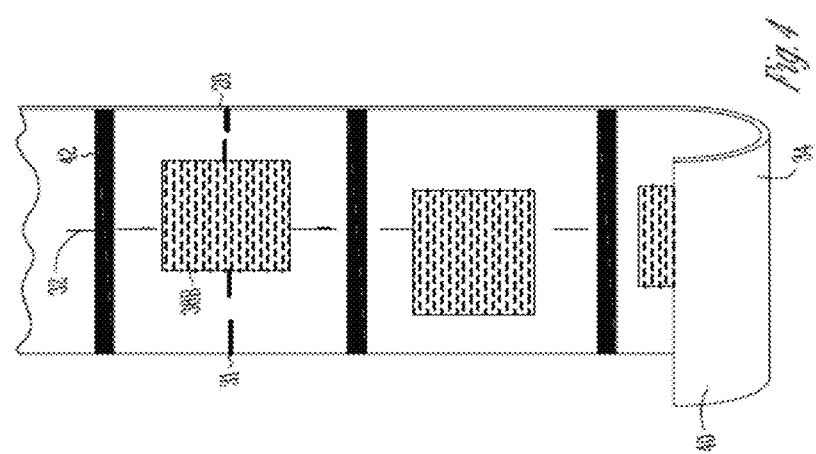
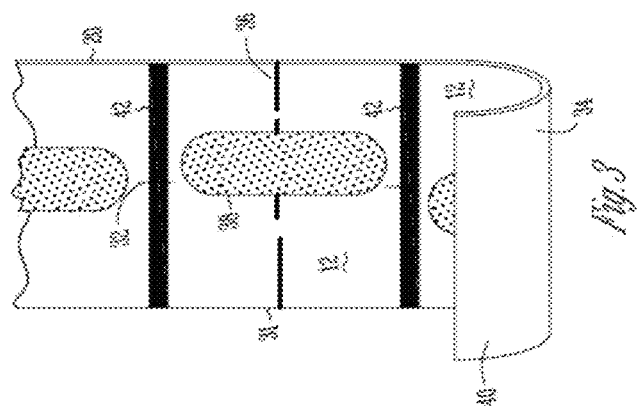

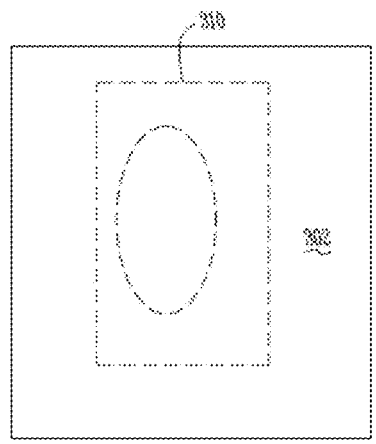

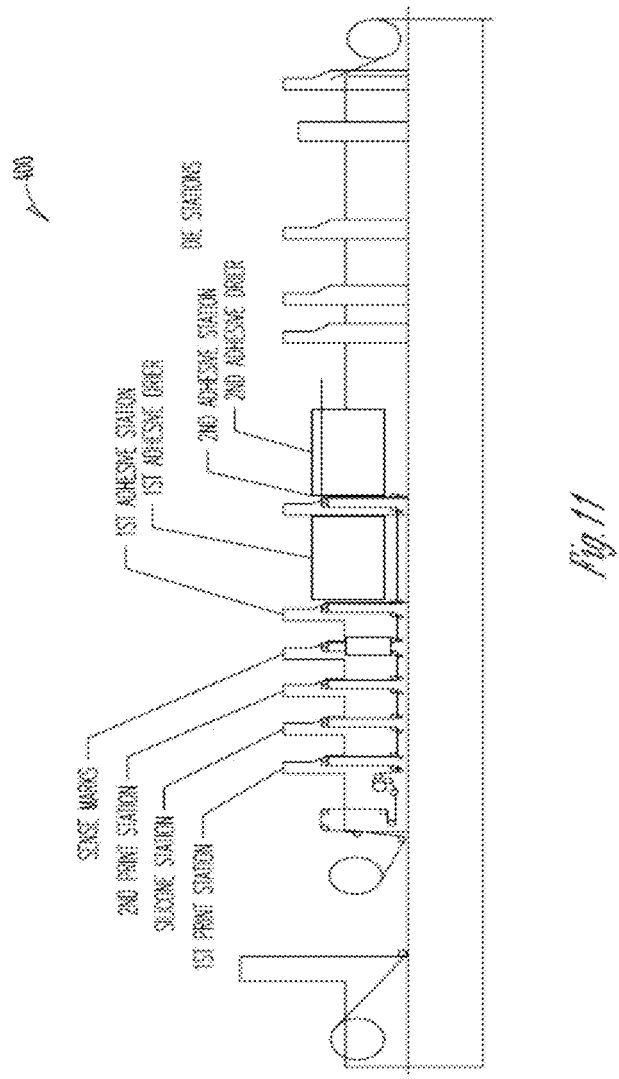

ADHESIVE LABEL AND ROLL

CLAIM OF PRIORITY

This patent application is a continuation of U.S. application Ser. No. 15/241,570, filed Aug. 19, 2017, this entry is hereby incorporated by reference herein.

BACKGROUND

The ubiquitous adhesive label is available in a myriad of configurations for use in various applications, including specialty applications. The typical adhesive label includes pressure-sensitive adhesive on its back side and is initially laminated to an underlying release liner.

Adhesive labels may be found in individual sheets, or joined together in a fan-fold stack, or in a continuous roll (web). Label rolls are typically used in commercial applications requiring high volume use of labels.

The challenge with adhesive-based printing applications is that too much adhesive applied to a label can over time collect on mechanical components of the printer during printer operation. So, any label having an adhesive coating that is fed through a printer can interfere with print quality and cause printer jams.

Moreover, during manufacture of the adhesive label rolls repeated placement of the adhesive patch in a same amount and in a same location with each label can result in wrinkling of the web and/or ridges forming as the web is wound onto the reel.

Still further, when labels are applied to items (after printing and removal from the web), the labels can lip up (flag or flare) along their perimeters resulting in some cases in the labels falling off the items to which they are applied. In some instances, these types of problematic labels can also interfere with other materials added to the items, such as a coffee collar slipped over a cup of coffee where the label faring prevents the coffee collar from properly fitting over the cup.

Therefore, it would be desirable to provide an improved adhesive patch.

SUMMARY

In various embodiments, an adhesive label and roll of adhesive labels are provided.

According to an embodiment, an adhesive label is provided. The adhesive label including an adhesive patch covering at least 50% but less than 85% of a backside surface area of the adhesive label, wherein the adhesive patch is at least partially horizontally and vertically centered on the backside surface.

BRIEF DESCRIPTION OF THE DRAWINGS

FIG. 1 is a diagram of a thermal printer dispensing a label having an adhesive patch, according to an example embodiment.

FIG. 2 is a diagram of a label roll having adhesive patches, according to an example embodiment.

FIG. 3 is a diagram depicting a backside view of the label roll of the FIG. 2, according to an example embodiment.

FIG. 4 is a diagram depicting another backside view of the label roll of the FIG. 2 having a different adhesive patch from that which was depicted in the FIG. 3, according to an example embodiment.

FIG. 9 is a view of a second surface of the linerless label of FIG. 8, including printed text, according to an embodiment.

FIG. 10 is a view of a first surface of the linerless label of FIG. 8, including a strip of activated adhesive with a void, according to an embodiment.

FIG. 11 is an example apparatus for applying adhesive patches with voids, according to an example embodiment.

DETAILED DESCRIPTION

Figure 5:
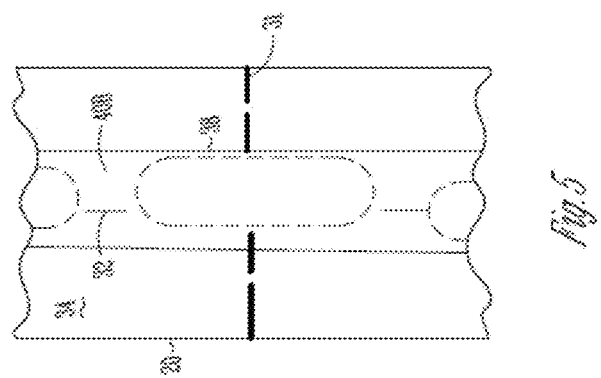
FIG. 5 is a diagram depicting a front-side view of a portion of a label roll having an adhesive patch, according to an example embodiment.

As will be described more completely herein and below, a single adhesive patch substantially centered horizontally and vertically on a backside of a label improves paper feed for printers and other performance and processing properties for thermal-printed, labels, linerless labels, and related products while maintaining acceptable adhesion properties for the label.

The term "Sticky Media" refers to a paper product (such as a label or linerless label) featuring a thermal top coating (i.e. a coating that darkens when exposed to heat, known as a "thermal coating") and a pressure sensitive adhesive (PSA) coated on the reverse side of a substrate. The thermal-coated top surface is over coated with low surface energy silicone (or silicone-free (water based) release agent/mixture) to allow the paper to release from itself when wound into a roll, without picking or causing other product defects in the media.

The adhesive patches, discussed herein, enable a distribution of tack over horizontally centered areas of the backside of the labels (such as but not limited to receipts, shipping/mailing labels, etc.). Furthermore, the horizontally centered adhesive patch is also centered vertically on the backside of a label or off-centered a bit vertically so as to avoid contact of cutting mechanisms in Point-Of-Sale (POS) printers, which cut in different regions in response to reading sense marks on the rolls.

Each label includes a single large adhesive patch that covers: 50% or slightly over 50% of the surface area of the backside of the label but not more than: 79% (for a 40 mm or 39.5 mm labels), 80%, or 84% (for 80 mm or 79.5 mm labels) of the surface area of the backside label. The labels are manufactured on rolls. In an embodiment, the single large adhesive patch covers over 50% of the surface area but not more than what is needed for allowance of sense marks and a width of a printer cutting knife for purposes of recognizing the label from a sense mark that is adhesive free and for purposes of cutting the label from the web without the printer cutting knife engage any adhesive (based on the cutting knife width and path along the label where the label is cut from the web). In an embodiment, the single large adhesive patch covers all but 3.175 mm reserved for a sense mark and 3.81 mm reserved for side margin slitting (cutting) allowance of the printer.

In some embodiments, the single large adhesive patch includes one or more voids where no adhesive exists. In some embodiments, the voids in the single large adhesive patch is in a striped (grooved) pattern. In distinction to approaches that use multiple small adhesive patches to the backside of a label, the novel approaches herein for a single large patch with voids is better able to distribute adhesive mass and counter tendencies towards label: "flapping," "flagging," "flaring," "lipping up," or curling along the perimeters of the labels when the labels are applied to a package or item. Moreover, with the labels presented herein, there is a greater chance that the person applying the labels in a rush will actually press regions of the receipt having adhesive. Still further, a single large patch with one or more voids (as presented in some embodiments below) maintains acceptable performance within a printer while the one or more voids counter the increase in binding that would occur with a solid patch having a same perimeter as the adhesive patch with the one or more voids. Additionally, a single large patch with one or more voids (as presented herein) provides more coverage area on the backside of the label to enable distribution of tack over a wide area of the label while conserving the mass of the applied adhesive. In some embodiments, the single large adhesive patch with one or more voids is applied to a label roll such that the void regions within the roll are staggered from label to label; this improves the manufacturing process by inhibiting the tendency to form wrinkles in the machine direction aligned with the voids.

In an embodiment, the adhesive patch with one or more voids includes a small area of adhesive to avoid wrinkling tendencies in the label. The small area of adhesive is discontinuous with the other adhesive that surrounds the void area. In some cases, the small area of adhesive is centered within the void area.

A single large adhesive patch with zero or more voids (as presented herein) is applied to a surface of print media to form a label. The labels are cut from a roll. In an embodiment, the patches with voids may be of any geometric shape, of varying size, and applied in various patterns.

In an embodiment. "large" is intended to mean that the single adhesive patch (with or without voids) covers more than 50% but less than 85% of the surface area available on the backside of the label.

In an embodiment, "large" is intended to mean that the single adhesive patch (with or without voids) covers slightly over 50% of the surface area available on the backside of the label. Slightly over 50% means greater than 50% of the available surface area but less than or equal to about 62%, 79%, 80%, or 84% of the available surface area. In an embodiment, the area of the backside surface of the label not having adhesive is equal to the surface area of any sense mark on the label plus the surface area reserved for slitting (cutting) the label from the web.

It is also to be noted that the adhesive patch can include voids (as discussed above) such that the single large patch may have one or more areas that lack any adhesive. In these embodiments (adhesive patches with one or more voids), the applied adhesive of the adhesive patch can cover less than 50% of the available surface area of the backside of the label (but the patch itself (including the void(s) covers over 50% but less than 85% of the available surface area).

In an embodiment, the single large adhesive patch (with or without one or more voids) employs a high-tack pressure sensitive adhesive.

In an embodiment, the single large adhesive patch (with or without one or more voids) employs any pressure sensitive adhesive.

The presented singular adhesive patches (with or without manufactured void areas) enables the production of a superior label by enabling a larger backside adhesive coverage area in proximity to the label perimeter while, potentially, utilizing a lesser amount of adhesive from that which is deployed in conventional adhesive patch applications. This can result in: i) lowered amounts of adhesive being required; thereby, reducing the cost of manufacture, ii) reduced maintenance on mechanical components of printers processing the presented adhesive patches (by reducing adhesive buildup on the mechanical components, iii) improved lifespan of the printer and mechanical components, iv) improved adhesive label with less flagging, flaring, curling, etc., and v) improved manufacture of adhesive label rolls by reducing lateral movement of the web at the rewind reel during manufacture.

The FIGS. are now discussed, but it is to be noted that the presented adhesive patch 38 in the FIGS. is not necessarily drawn to scale. That is, the adhesive patches 38 presented in the FIGS. is intended to be the single large adhesive patch (with or without voids) that covers at least 50% but less than 85% of the available surface area on the backside of a label.

FIG. 1 is a view of a thermal printer dispensing pressure sensitive labels; each label having a single large adhesive patch (with or without one or more voids), according to an embodiment. With reference to FIG. 1, a printer 10 configured for printing in sequence individual labels 12 for use in a typical fast food application. For example, food may be placed in a suitable food package 14 such as the paper box illustrated, or simple wrapping paper. Printer 10 may include a thermal printer, such as a single or double-sided thermal printer (as shown in the FIG. 12).

Print or identifying indicia 16 is printed on a label 12 in printer 10 for identifying the contents of the package, for example. The individual printed label 12 may then be removed from printer 10 and applied using the adhesive patch (with or without one or more voids 38) to the food package 14.

It is to be noted that the adhesive patch (with or without one or more voids 38) is not drawn to scale in the FIG. 2 and the patch 38 covers a greater surface area (at least 50% but less than 85%) of the backside of the label 12 than what is depicted in the FIG. 1. Moreover, the patch 38 can include one or more voids as illustrated in the FIGS. 7B-7F below.

FIG. 2 is a diagram of a label roll having adhesive patches, according to an example embodiment.

The front surface 34 of the roll 18 includes a release strip 40 which extends along the running axis behind at least a portion of the adhesive patches 38. The release strip 40 may be formed of any suitable releasing material, such a cured silicone or acrylic suitably coating or impregnating the web front surface 34. In an embodiment, the releasing material is water-based and substantially free of silicone. In this way, a column or row of the adhesive patches may be laminated to the release strip 40 in successive layers of the roll 18 without the need for a separate liner. The single ply web 20 is wound into the roll 18 and is therefore linerless.

When the linerless roll 18 is mounted in a printer 10 (FIG. 12), the adhesive-less front surface 34 faces upwardly to engage web guides and a printing head for preventing adhesive contact therewith. The adhesive coated backside surface 36 faces downwardly and is suitably spaced from adjacent portions of the feed path for preventing inadvertent bonding therewith.

The non-stick platen roller drives or pulls the web 20 along its feed path within the printer 10 (FIG. 12) permitting individual labels 12 to be cut therefrom and immediately downstream from the non-stick platen roller. In some embodiments, when the adhesive patches 38 includes one or more voids (FIGS. 7B-7F) buildup of adhesive on the cutting blade or label separation mechanism is reduced and/or limited to a small region.

The web 20 includes a longitudinal (vertical) axis 32 representing a center of the web 20 and each label 12 includes a latitudinal (horizontal) axis 31 representing a center of that label 12. Each label 12 includes a single large adhesive patch 38 that is centered along the horizontal axis 31 of that label 12 and that is offset slightly from the vertical axis 32.

Moreover, the adhesive patch 38 as applied to the labels is staggered in a different offset centered and/or horizontal position along the vertical axis 32 and/or horizontal axis 31, such that the amount of adhesive in the web 20 does not congregate in the roll 18 in a singular location within each label 12. This reduces web wobble during manufacture and varies the buildup of adhesive on the mechanical components of the printer 10 (FIG. 12) when the web 20 is installed for application.

The adhesive patches 38 may be in any geometric shape and may include one or more voids.

FIG. 3 is a diagram depicting a backside view of the label roll 18 of the FIG. 2, according to an example embodiment.

The adhesive patches 38 are an oval shape and that are staggered and offset from being vertically centered (off-centered) along the vertical axis 32 from label 12 to label 12. The adhesive patches 38 are also centered along the horizontal axis 31 from label 12 to label 12.

Also illustrated in the FIG. 3 are sense marks 42 on the web 20. The sense marks 42 are read by printer 10 for determining each individual label 12 from the web 20. The sense marks 42 can include various configurations, such as a black line extending horizontally across the full width of the web 20 or they may extend horizontally across a small width of the web 20 (as shown in FIGS. 7A-7F). The sense marks 42 are positioned along the web 20 between adjacent labels 12 providing the printer 10 with a precise cutting location across the web 20 for dispensing the labels 12 individually.

FIG. 4 is a diagram depicting another backside view of the label roll 18 of the FIG. 2 having a different adhesive patch 38B from that which was depicted in the FIG. 3, according to an example embodiment.

The adhesive patches 38B in the FIG. 4 illustrate a rectangular shape as opposed to the oval shape depicted in the FIG. 3. The edges of the patch 38B run parallel to the corresponding edges of the label 12.

The patches 38 of the FIGS. 3 and 38B of the FIG. 4 are off-set centered (off-centered) along the vertical axis 32 of the web 20 and the horizontal axis 31 of each label 12. The vertical centering is staggered from label 12 to label 12 within the web 20.

Moreover, the patches 38 and 38B cover at least 50% but less than 85% of the available surface area on the backside 36 of each label 12, and each label 12 includes a single patch (38 or 38B) with or without voids (discussed in the FIGS. 7B-7F below).

FIG. 5 is a diagram depicting a front-side view of a portion of a label roll 18 having an adhesive patch 38, according to an example embodiment.

The FIG. 5 illustrates an alternative embodiment for a release strip 40B, which is just wide enough to cover the staggering single large adhesive patches 38 in each label 12 within the web 20. This leaves the remainder of the front-side 34 of the web 20 devoid or free of any release material. This conserves release material and is useful in thermal transfer printing in which a transfer ribbon is suitably provided between the printing head and the exposed front surface 34 of the web 20 to the side of the just wide enough release strip 40B.

Figure 6:
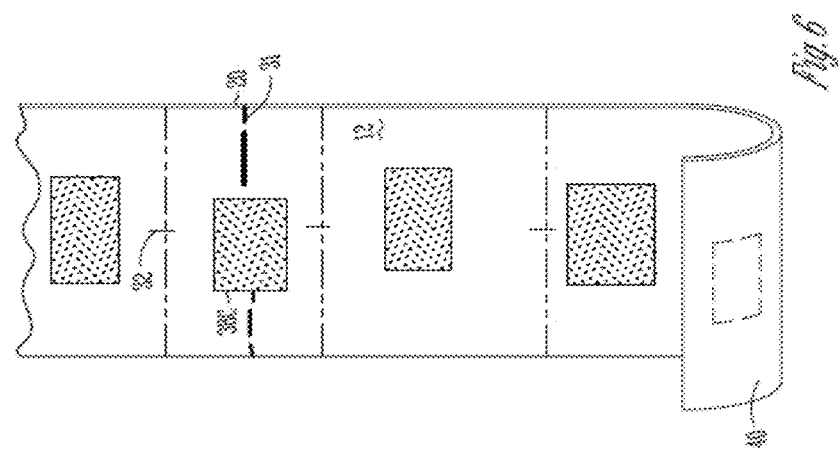
FIG. 6 is a diagram depicting a back-side view of a portion of a label roll having an adhesive patch, according to an example embodiment.

FIG. 6 is a diagram depicting a back-side view of a portion of a label roll 18 having an adhesive patch 38C, according to an example embodiment.

The FIG. 6 is intended to illustrate that a web 20 devoid of any sense marks permitting variable sized labels with each label including a single large adhesive patch 30C. The lines defining each label 12 in the FIG. 6 is intended only to illustrate each variable sized label 12 and not indicative sense marks.

FIGS. 7A-7F depict different adhesive patches, according to example embodiments.

Figure 7C:
FIGS. 7A-7F depict different adhesive patches, according to example embodiments.
Figure 7B:
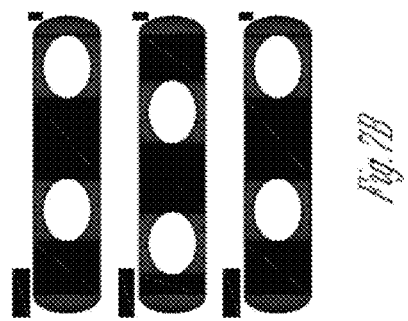
Figure 7A:
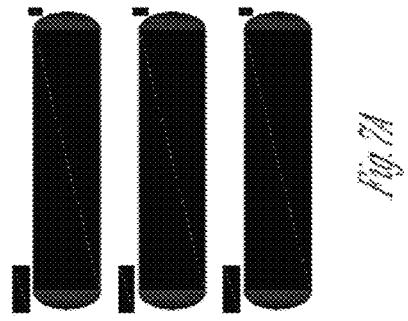

The FIG. 7A illustrates a solid adhesive patch that covers at least 50% but less than 85% of the backside of a label. Three separate labels are illustrated along the backside of web and delineated by sense marks that separates each individual label (the small hash marks above each solid adhesive patch representing the sense marks). In an embodiment, the solid adhesive patches cover approximately and about 62% of the available surface area on the backside of the labels.

The FIG. 7B illustrates an adhesive patch that covers at least 50% but less than 85% of the backside of a label but includes adhesive on approximately 47% of the of backside of the label. Each label (3 illustrated in the FIG. 7B) includes two void-shaped ovals that are devoid of any adhesive. The location of the void-shaped ovals varies from label to label on the web. The adhesive patch itself (including the void ovals) covers at least 50% but less than 85% of the entire backside surface of each label but because of the voids within the adhesive patch the adhesive only covers about 47% of the backside surface area.

The FIG. 7C includes an adhesive patch that covers at least 50% but less than 85% of the backside surface of each label (again, 3 illustrated on the web of the FIG. 7C), but voided groove areas within the adhesive patch permits the adhesive within the adhesive patch to cover approximately 41.5% of the backside surface of each label.

It is noted that different shapes, patterns of both the adhesive patch and the voids within the adhesive patch can be achieved to arrive at a configured (desired) amount of adhesive within the single large adhesive patch (more than 50% but less than 85% coverage of the backside surface of the label). Therefore, the adhesive patches with voids as shown in the FIGS. 7B-7C are intended to be illustrative and not limiting herein.

Figure 7F:
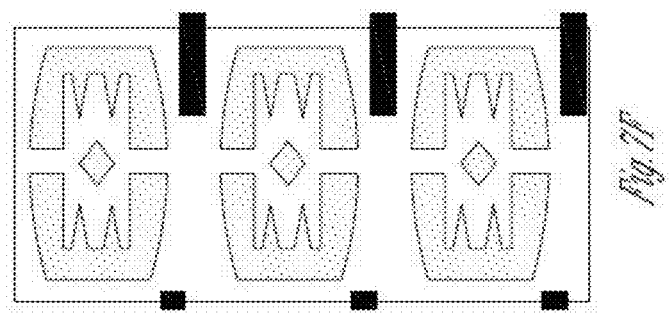
Figure 7E:
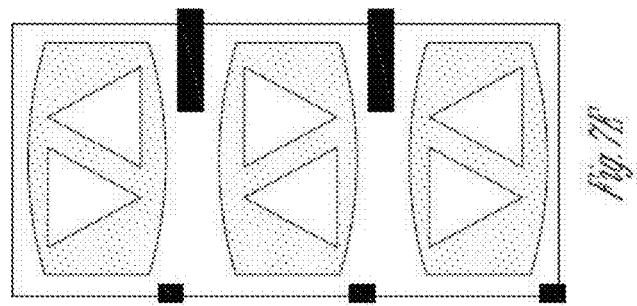
Figure 7D:
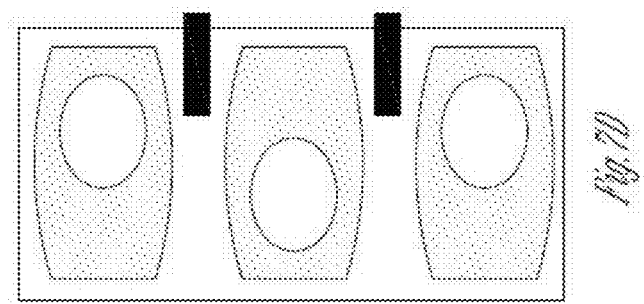

FIG. 7D is a diagram of adhesive patches with staggering voids applied to labels in a web, according to an example embodiment. The perimeter of the adhesive patch (gray area with white oval void) is in proximity to the perimeter of the label (each label on the web in the FIG. 7D is separated by a back rectangular sense mark). The void area of the adhesive patch intersects a center of the label but does not completely overlap the center of the label. Moreover, the location of the void area varies from label to label (the first label having a void area offset about the center of the label to the right, the second label having a void area offset about the center of the label to the left, and the third label having a void offset area similar to that of the first label).

Having the void area in the adhesive patch vary from label to label while avoiding ever completely overlapping void centers and still intersecting at least a portion of the center results in optimal machine performance at the rewind end of the machine. If the voids were all aligned, the rewind reel would tend to build ridges along the glue (adhesive) pattern that runs in the machine direction, the regions of adhesive that define the lateral perimeter of the patch. These ridges destabilize the roll.

Additionally, less margin between the adhesive patches with voids and the label perimeter is achievable with less adhesive being required, which creates better tack and reduces flagging and flaring when the labels are applied to packaging as receipts after being imaged by a printer and removed from the roll.

Still further, because less adhesive is used during manufacture of the web, there is less adhesive concentrated over the length of the web, which makes the web (roll) softer than conventional manufactured rolls and allows the web of the present teachings to be more easily unwound by a printer during receipt printing in a retail environment. This produces less wear and tear on the printer and printer components.

Also, the adhesive patch with void labels manufactured on the web require less drying energy because less adhesive is used than conventional adhesive patch applications. That is, the amount of heat or the time to dry adhesive patches on labels is a function of the amount of adhesive being used per patch and since less adhesive per patch is required with the teachings presented herein, less heat and/or less drying time is required during label manufacture than conventional approaches.

The FIG. 7D also illustrates a single large adhesive patch per label that covers at least 50% but less than 85% of the backside surface of the label; the illustrated adhesive patch having a single large voided area (as opposed to multiple void areas as illustrated in the FIGS. 7B-7C).

FIG. 7E is a diagram of other adhesive patches with staggering voids applied to labels in a web, according to an example embodiment. FIG. 7E illustrates that multiple voids may appear within a single large adhesive patch that covers at least 50% but less than 85% of a backside surface of the label.

The voided areas within each label is varied along the web by changing the orientation of the shapes for the voided areas. This can also be done by changing the location of the shapes within the adhesive patch as was shown in the FIG. 7B. Moreover, this can be done by changing from label to label the shapes within the adhesive patches.

FIG. 7F is a diagram of adhesive patches with voids having a small amount of adhesive applied in the void region, the adhesive patches applied to labels in a web, according to an example embodiment.

The adhesive patches with voids of the FIG. 7E include a small amount of adhesive within the center of the void (darkened diamond in the FIG. 7E, white area are void areas, darkened areas are adhesive areas).

The layout of the large adhesive patch with a void area having an additional amount of adhesive (as shown in the FIG. 7E) prevents bubbling of the label when it is affixed to packaging.

In an embodiment, the coverage area of adhesive within the adhesive patch having one or more voids is greater than the coverage area of the void(s) (as shown in the FIG. 7E).

In an embodiment, the coverage area of the adhesive within the adhesive patch having one or more voids is less than the coverage area of the void(s) (as shown in the FIG. 7E).

In an embodiment, the coverage area of the adhesive within the adhesive patch having one or more voids is substantially the same as the coverage area of the void(s).

In an embodiment, void geometric shape(s) within the adhesive patch with one or more voids is configurable and varies from label to label during manufacture of a web of labels.

Again, each label illustrated in the FIG. 7E includes a single large adhesive patch that covers at least 50% but less than 85% of a backside surface area of the label. The actual amount of adhesive within each single large adhesive patch can vary as discussed above.

FIGS. 3-5 illustrate an example linerless label 100 that includes a printable surface including imaging material on one side and a heat-activated adhesive surface on the other side having a release coating, according to embodiments of the invention. It is to be noted that other types of labels are also envisioned.

Figure 8:
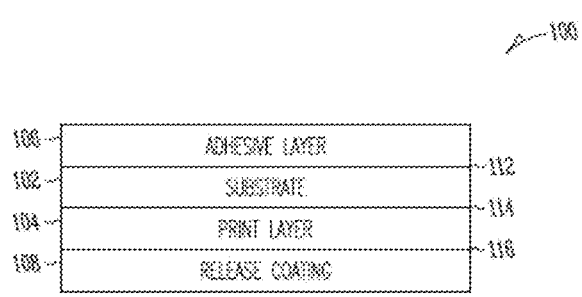
FIG. 8 is a cross-sectional view of a linerless label, according to an embodiment.

FIG. 8 is a cross-sectional view of a linerless label having an adhesive patch with one or more voids, according to an embodiment.

With reference to FIG. 8, linerless label 100 is formed of layers including a substrate 102, a thermal print layer 104, a heat-activated adhesive layer with one or more voids 106, and a release coating 108. The adhesive layer (with or without one or more voids) 106 overlies a first surface 112 of the substrate 102 and the print layer 104 overlies a second surface 114 of the substrate 102 of the print layer 104. The release coating 108 overlies surface 116 of the print layer 104. The adhesive layer 106 having an adhesive patch comprised of an adhesive or adhesive mixture with or without one or more voided areas (areas devoid of any adhesive or adhesive mixture within the adhesive patch).

In some embodiments, substrates may be thermally resistant in order to prevent heat applied to one side of the substrate from activating materials on the other side of the substrate.

Linerless label 100 may be wound into a roll. The adhesive layer with one or more voids 106 comes into contact with the release coating 108, thereby minimizing adhesion between the adhesive layer 106 and the print layer 104 or underlying substrate 102.

The print layer 104 can include one or more layers of thermal imaging material. For instance, the print layer 104 can include a thermal transfer receptive coating suitable for thermal transfer printing. Alternately or additionally, the print layer 104 may include one or more thermally sensitive coatings which are adapted to change color upon application of heat thereto by which direct thermal printing is provided.

The adhesive layer with or without one or more voids 106 may include adhesives and may be applied in patches (in any of the manners discussed above) using a printing press.

As an alternative to using a separate print layer 104, substrate 102 could comprise thermochromic paper. A thermal print head can print visible patterns on thermochromic paper without requiring an additional print layer to be formed on the substrate.

FIG. 9 is a view of a second surface of the linerless label of the FIG. 8, including an example printed or imaged text, according to an embodiment.

That is, FIG. 9 illustrates an example of a second surface 202 of the linerless label 100 after printing. In this example, the label 100 is a receipt for a fast food meal. As shown in FIG. 9, the second surface 202 of the linerless label 100 has been printed with transaction information by, for example, direct thermal printing of one or more thermally sensitive compounds in the print layer 104.

FIG. 10 is a view of a first surface of the linerless label of FIG. 3, including a strip of activated adhesive (having at least one contiguous are devoid of any adhesive within the strip although a solid adhesive strip can also be included), according to an embodiment.

The first surface 302 includes a wet adhesive portion in the form of a tacky strip 310 of heat-activated adhesive material (having a void devoid of any wet adhesive portion) that has been activated by, for example, a thermal print head. In this example, the tacky strip 310 can be used to attach the receipt to an associated bag of food or a cup of coffee. Consequently, the bag or cup with the receipt can be handed to a customer simultaneously.

The tacky strip 310 can be formed in one of at least two different methods. In the first method, the entire first surface 112 of the substrate 102 can be overlaid by a heat-activated adhesive with a voided region that is dry and non-tacky prior to activation. Then, only a selected portion of the heat-activated adhesive, the portion defining the strip 310, is activated by heat applied with a thermal print head. Depending on the embodiment, such activation may occur at or substantially at the same time as, or at some time after the second surface 202 of the receipt has been printed with transaction information. In the second method, a portion of the first surface 302 defining the strip with one or more voided regions 310 can be overlaid with a heat-activated adhesive that is dry and non-tacky prior to use. The entire heat-activated adhesive can be activated by a thermal print head, which activation may, depending on the embodiment, occur at or substantially at the same time as, or at some time after the second surface 202 of the receipt has been printed with transaction information. Either manner will result in a tacky adhesive strip with one or more voided regions 310. When a double-sided thermal printer is used, a first thermal print head can print on the second surface 202 of the receipt while a second thermal print head activates the first surface 302 of the receipt.

The substrate can be paper, such as a base paper, a single layer coated paper, a several layer coated paper, a thermal coated paper, a top coated paper (over the thermal coating), film, or any other substrate that can receive coated layers.

FIG. 11 is an example apparatus for applying large adhesive patches with or without one or more voided regions that are devoid of any adhesive, according to an example embodiment.

An example press 400 is illustrated. The example press is a flexographic or "flexo" printing press.

Figure 12:
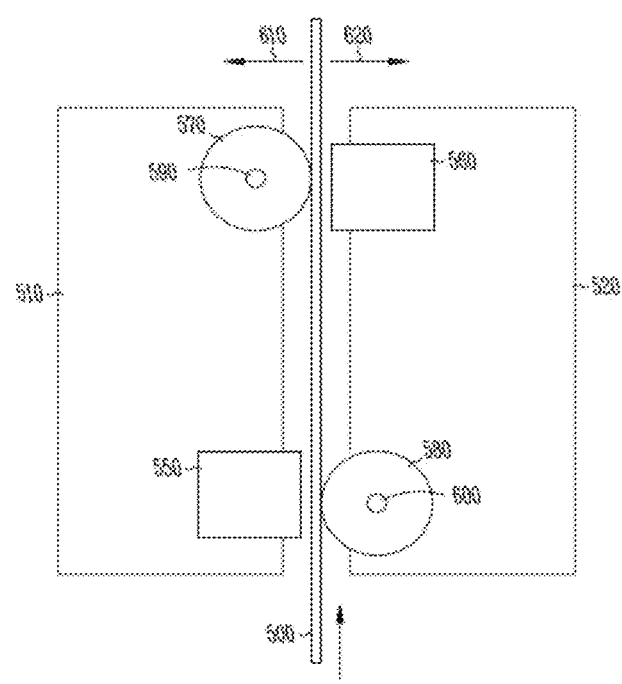
FIG. 12 is an example double-sided thermal printer for printing labels having adhesive patches with voids, according to an embodiment.

FIG. 12 is an example double-sided thermal printer for printing labels having a single large adhesive patch with or without one more voided regions devoid of any adhesive, according to an embodiment.

An example double-sided thermal printer includes a first print head assembly 510, a second print head assembly 520, and a motor. The first print head assembly 510 includes a first print head 550 and a first platen 570 rotatable about a first shaft 590. Similarly, the second print assembly 520 comprises a second print head 560 and a second platen 580 rotatable about a second shaft 600.

During operation of the double-sided thermal printer, the motor drives the first and second shafts 590 and 600 to turn the first and second platens 570 and 580. Accordingly, when a label 500 is fed into the printer, rotation of the first and second platens 570 and 580 pushes the label 500 in a direction indicated by a vertical arrow. As the label 500 passes through the printer, the first and second print heads 550 and selectively heat the two sides of label 500 to perform printing operations. More particularly, first print head 550 performs printing operations on a side of label 500 indicated by an arrow 610 and second print head 560 performs printing operations a side of label 500 indicated by an arrow 620.

In an embodiment, when the applied adhesive (having one or more void regions that are devoid of any adhesive) is applied to the substrate it can be a pressure-sensitive adhesive. In such a case, pressure can be applied to the adhesive at a customer's location for the receipt to adhere to customer items, such as, but not limited to: paper/foil wraps, cardboard boxes, clam shells, fries' sleeves, cups, etc.

Each embodiment presented herein includes a single large adhesive patch per label that is aligned or centered horizontally and/or partially aligned or centered (in an offset manner—off-centered) vertically. The adhesive patch may include no voided areas that are devoid of adhesive; may include a single voided area that is devoid of adhesive material; or may include two or more voided areas that are devoid of adhesive material. The single adhesive patch covers at least 50% but less than 85% of a backside available surface area of the label. The manufactured web or roll of adhesive labels can vary the location (by offsetting the vertical centering so that a different portion of the adhesive patch is included in the center of the label) of the adhesive patches (or voided areas within the adhesive patches) from label to label within the web.

Although the present invention has been described with particular reference to certain preferred embodiments thereof, variations and modifications of the present invention can be effected within the spirit and scope of the following claims.

The invention claimed is:

1. A method, comprising:
    imaging, by a thermal printer, a first side of a label; and
    activating, by the thermal printer, a single adhesive patch on a second side of the label that covers at least approximately 50% but less than approximately 85% of the second side and that is at least partially horizontally and partially vertically centered on the second side, wherein the label includes only the single adhesive patch.

2. The method of claim 1 further comprising, cutting, by the thermal printer, the label from a roll of labels and dispensing the label from the thermal printer during a print job being processed on the thermal printer.

3. The method of claim 1 further comprising, avoiding, by the thermal printer, a least one void area that is present on the second side and that is devoid of any adhesive material.

4. The method of claim 3 further comprising, avoiding, by the thermal printer, the at least one void area as a plurality of void areas each of which are devoid of any adhesive material.

5. The method of claim 4 further comprising, obtaining, by the thermal printer, a next label for a next print job from the roll of labels being fed through the thermal printer, and activating a second single adhesive patch on a second side of the next label, wherein the second single adhesive patch is offset vertically from a center of the backside of the next label and is in a different location from the single adhesive patch associated with the label of the print job.

6. The method of claim 5, wherein cutting further includes cutting, by the thermal printer, the label for the print job and the second label for the second print job from the roll of labels ensuring that a cutting blade/knife avoids the single adhesive patch and the second single adhesive patch.

7. The method of claim 1, wherein activating further includes apply pressure to the single adhesive patch to activate a pressure-sensitive adhesive material of the adhesive patch.

8. A method, comprising:
applying single adhesive patches on a backside of a roll of labels, each label including a single pressure-activated adhesive path as a corresponding single adhesive patch that covers approximately 50% and less than 85% of the backside for that label;
wherein applying further includes situating each single adhesive patch to be substantially centered on the backside of the corresponding label with placement of each single adhesive patch slightly offset vertically from a previously applied single adhesive patch associated with a previously label in the roll of labels, wherein each label comprises only a single adhesive patch on the backside that covers approximately 50% and less than 85% of the backside for that label.

9. The method of claim 8 further comprising, applying a thermal print layer to a front side of each label in the roll of labels.

10. The method of claim 9 further comprising, applying a release layer over top of the thermal print layer on each label in the roll of labels.

11. The method of claim 10 further comprising, imaging a sense mark on the backside of each label in an area that is different from the single adhesive patch on each label in the roll of labels.

12. The method of claim 11 further comprising, winding the roll of labels, feeding the roll of labels into a thermal printer for print jobs, selectively activating, by the thermal printer, the thermal print layer for each print job, pressure activating, by the thermal printer, the pressure-activated adhesive patch of each label for each print job, cutting, by the thermal printer, each label from the roll of labels for each print job, and dispensing, by the thermal printer, each label from the thermal printer for each print job.

* * * * *